(12) United States Patent
Faletti

(10) Patent No.: US 10,755,251 B1
(45) Date of Patent: Aug. 25, 2020

(54) VISIBLE AND ACCESSIBLE ESCROW SYSTEMS AND METHODS

(71) Applicant: Capital One Services, LLC, McLean, VA (US)

(72) Inventor: Stephen van Beek Faletti, Brooklyn, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/676,566

(22) Filed: Nov. 7, 2019

(51) Int. Cl.
*G06Q 20/10* (2012.01)
*G06Q 20/18* (2012.01)
*G06F 3/0482* (2013.01)
*G07F 19/00* (2006.01)
*G07D 11/00* (2019.01)

(52) U.S. Cl.
CPC ....... *G06Q 20/1085* (2013.01); *G06F 3/0482* (2013.01); *G06Q 20/18* (2013.01); *G07D 11/0096* (2013.01); *G07F 19/202* (2013.01)

(58) Field of Classification Search
CPC .. G06Q 20/1085; G06Q 20/18; G07F 19/202; G06F 3/0482; G07D 11/0096
See application file for complete search history.

(56) References Cited

U.S. PATENT DOCUMENTS

| | | | |
|---|---|---|---|
| 3,079,603 A | 2/1963 | Simjian | |
| 3,447,655 A | 6/1969 | Tanaka et al. | |
| 4,602,332 A | 7/1986 | Hirose et al. | |
| 5,286,017 A | 2/1994 | Hawk et al. | |
| 6,422,458 B1 | 7/2002 | Katou | |
| 6,749,053 B2 | 6/2004 | Ikuta | |
| 6,758,395 B2 | 7/2004 | Elwin | |
| 7,522,759 B2 | 4/2009 | Elwin et al. | |
| 7,819,308 B2 * | 10/2010 | Osterberg | G06Q 20/1085 235/379 |
| 7,954,700 B2 | 6/2011 | Stapfer | |
| 9,589,409 B2 | 3/2017 | Iwamura et al. | |
| 2010/0230232 A1 | 9/2010 | Uesaka et al. | |

FOREIGN PATENT DOCUMENTS

GB   2225662 A   6/1990

* cited by examiner

*Primary Examiner* — Seung H Lee
(74) *Attorney, Agent, or Firm* — Troutman Pepper Hamilton Sanders LLP; Christopher J. Forstner; John A. Morrissett

(57) ABSTRACT

Disclosed herein are systems and methods for processing financial instruments in ATMs or other processing devices. A user can deposit financial instruments, such as cash or a check, into the ATM, to be processed to determine the monetary value of the financial instruments. Once counted and valued, the financial instruments can be dropped into an escrow chamber. The escrow chamber can have a door or gate such that the financial instruments are visible, but not accessible during the transaction. If the customer discovers an error during the transaction, the door or gate can transition to an open state allowing the customer to retrieve the financial instruments.

26 Claims, 7 Drawing Sheets

VISIBLE AND ACCESSIBLE ESCROW SYSTEMS AND METHODS

FIELD OF THE DISCLOSURE

The present disclosure relates generally to visible and/or accessible escrow systems and methods; and particularly, to visible and accessible escrow systems and methods for providing access to deposited financial instruments during a transaction.

BACKGROUND

Automatic teller machines (ATMs) have become a ubiquitous part of everyday life.

ATMs are widely used to make transactions with a variety of financial instruments because they often provide for quick, easy, and more convenient service than, for example, interaction at a bank with a teller. Currently, however, ATMs have some shortcomings that simply cannot match the level of service provided when making a transaction with an actual bank teller. When conducting an in-person deposit, for example, there are opportunities to abort a transaction or remedy any errors that occurred during the processing of the transaction. If a teller miscounts a stack of bills, for example, the customer can simply ask the teller to recount the bills until agreement is reached. As a result, errors are quickly resolved with little to no inconvenience to the customer, the teller, or the bank. Errors or disputes with ATMs, on the other hand, can be somewhat more difficult to resolve. ATM deposits can be a challenge for many customers for a variety of reasons. ATMs generally have a single deposit throat or inlet, for example, which pulls financial instruments into the machine and processes them out of view of the customer. And, because it can be difficult to retrieve the bills or checks once inserted into the machine, the customer must hope that the financial instruments are correctly processed. During this time, the customer generally can no longer see or access their deposited financial instruments.

In some cases, customers may receive incorrect credit, or lose their deposit altogether, due to machine error, leaving the customer to file a dispute with the bank and hope that the financial instrument(s) can be recovered and properly credited to the customer. As with any machine, ATMs can also fail or jam during use. As a result, at least some portion of customers will only make deposits directly with a bank teller. This generally increases the time required for the customer to make a deposit and increases labor and capital costs for the bank, among other things.

What is needed, therefore, is a visible and accessible escrow system that can provide access to financial instruments during ATM transactions and improve the transparency of financial instrument processing at ATMs. The system should improve the customer's control during a transaction, increasing comfort in, and the use of, ATMs for deposits, bill pay, and other financial transactions. Embodiments of the present disclosure address this need as well as other needs that will become apparent upon reading the description below in conjunction with the drawings.

BRIEF SUMMARY OF THE INVENTION

Example of the present disclosure relate generally to visible and accessible escrow systems and methods. Particularly, examples of the present disclosure relate to a visible and accessible escrow chamber to enable financial instruments to be retrieved when needed during a transaction. The system can enable a user to insert bills or checks into, for example, an automated teller machine (ATM), have the ATM count the bills or checks and provide a value, and then confirm or deny the transaction (either based on an incorrect amount or for any other reason). The ATM can include an escrow chamber that is normally locked, but can be unlocked to enable the user to retrieve the bills or checks when the user decides not to proceed with the transaction. This could be because the ATM miscounted the bills or checks, the user inserted a different amount than they originally intended (e.g., they inserted $100 into the ATM, but only meant to deposit $60), or the user simply changed their mind about making a deposit.

An example of the present invention can provide a financial instrument processing device (e.g., an ATM, automated checkout counter, vending machine, etc.) comprising a receiving slot configured to receive one or more financial instruments from a customer, a financial instrument processing unit in communication with the receiving slot and configured to count and produce a value for the one or more financial instruments, an escrow chamber in communication with the financial instrument processing unit and having a secure state and an open state, and a financial instrument storage unit in communication with the escrow chamber. In this configuration, during at least a portion of a transaction, the one or more financial instruments can be stored in the escrow chamber pending receipt of an affirmative or negative indication from the customer.

If the affirmative indication is received, then the one or more financial instruments can be transferred from the escrow chamber to the financial instrument storage unit and the transaction can be completed. If, on the other hand, the negative indication is received, then the escrow chamber can move from the secure state to the open state to enable the customer to retrieve the one or more financial instruments and cancel the transaction. This provides customers with more control during transactions made using ATMs and enables the user to change their mind or any discrepancies to be resolved simply by canceling the transaction and retrieving the financial instruments.

The receiving slot can receive financial instruments through, for example, a bill throat or a coin hopper for receiving coins. In some examples, the escrow chamber can have a window on a door on a front area of the financial instrument processing device such that the one or more financial instruments are visible in the escrow chamber, but not accessible, when the escrow chamber is in the secure state. In other examples, the door can comprise a grate, or other similar barriers, such that the one or more financial instruments are visible in the escrow chamber, but not accessible, when the escrow chamber is in the secure state. The door can also allow the one or more financial instruments to be retrieved by a customer from the interior chamber in the open state. The escrow chamber can also define an interior chamber for holding the financial instruments.

The device can further comprise a display that can display financial instrument values and an option to continue or not continue with the transaction. An affirmative indication, for example, can be received in response to the customer electing to continue with the transaction. Alternatively, a negative indication can be received in response to the customer selecting not to continue with the transaction. The device can further comprise a manual override configured to send a signal to the escrow chamber to transition from the secure state to the open state.

The negative indication can be, for example, an indication that the value is not correct, an indication to cancel the transaction, or an indication not to continue with the transaction (for whatever reason). The affirmative indication can be an indication that the value is correct or an indication to continue with the transaction (for whatever reason). The affirmative or negative indication can be received in response to a display of the value, an affirmative option, and a negative option for the customer to make a selection between the affirmative option and the negative option.

Another example of the present invention can provide a method of processing financial instruments comprising receiving one or more financial instruments at a receiving slot of a housing configured to transfer the financial instruments to a financial instrument processing unit, processing the financial instruments with the financial instrument processing unit to determine a monetary value for the financial instruments, transferring the financial instruments to an escrow chamber having a secure state, an open state, and an interior portion at least partially visible to a customer in the secure state and in the open state, providing a message to the customer on a display comprising the value of the financial instruments and an option to continue or not to continue a transaction, and when the customer elects not to continue the transaction, causing the escrow chamber to move from the secure state to the open state to release the financial instruments or when the customer elects to continue the transaction, transferring the financial instruments to a financial instrument storage unit. The method can further comprise receiving a signal from a manual override and causing the escrow chamber to transition from the secure state to the open state in response to receiving the signal.

The receiving slot can comprise, for example, a bill throat for receiving paper financial instruments or a coin hopper for receiving coins. The escrow chamber can comprise a window disposed on a front area of the housing such that the financial instruments are visible in the escrow chamber, but not accessible, when the financial instruments are in the escrow chamber in the secure state. The escrow chamber can comprise a door accessible from a front area of the housing. The door can comprise a grate, or another similar barrier, such that the financial instruments are visible in the escrow chamber, but not accessible, when the financial instruments are in the escrow chamber in the secure state. The door can also enable the financial instruments to be retrieved from the interior portion in the open state.

Another embodiment of the present disclosure can provide an escrow device including a housing defining an interior chamber, a door having an open state and a secure state accessible from an exterior surface of the housing and providing access to the interior chamber in the open state and the interior chamber at least partially visible in the secure state. In some examples, the escrow device can be configured to receive one or more financial instruments from a financial instrument processing unit during a transaction. In response to a customer electing not to continue with the transaction, the escrow device can move the door from the secure state to the open state to enable the customer to retrieve the financial instruments. In response to a customer electing to continue with the transaction, the escrow device can transfer the financial instruments to a financial instrument storage unit. Also, in response to receiving a signal from a manual override, the escrow device can transition the door to the open state during the transaction.

The door can comprise a grate, or other similar barriers, such that the financial instruments are visible, but not accessible, when the financial instruments are in the interior chamber and the door is in the secure state. The door can alternatively be transparent such that the financial instruments are visible, but not accessible, when the one or more financial instruments are in the interior chamber and the door is in the secure state.

Also disclosed herein are methods of making and using the same. These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Figure 1A:
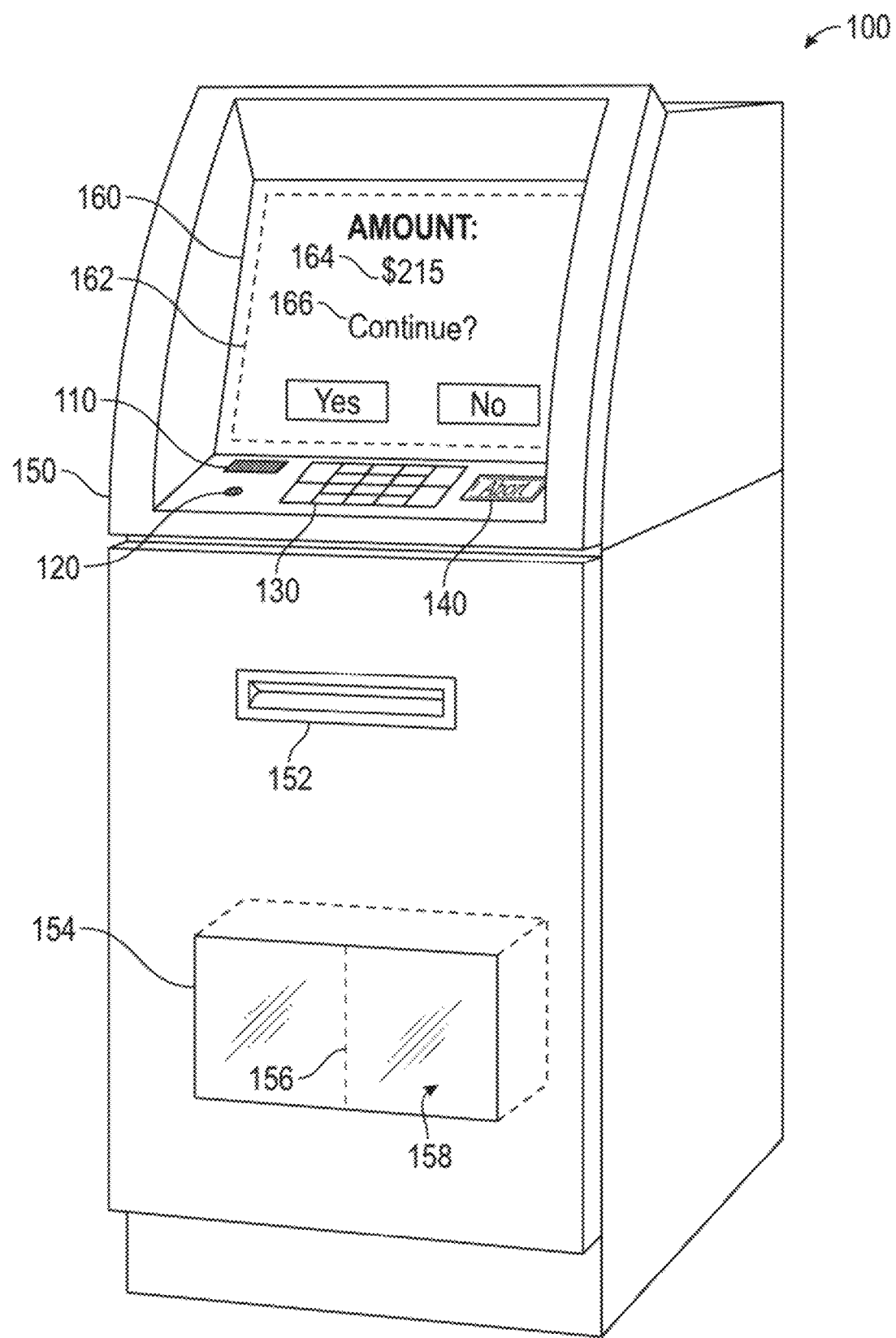
FIG. 1A is a perspective view of a financial instrument processing device according to some embodiments of the present disclosure.

As described above, a problem with current ATMs is that deposit transactions are a somewhat opaque process in which financial instruments are processed out of control of the customer. Using current technology, once financial instruments are drawn into the ATM at the deposit slot, they are generally not retrievable. As a result, if the financial instruments are not correctly processed by the ATM—e.g., the bills are not counted correctly, the handwriting on a check is misread, etc.—the customer is often left with little recourse other than filing a claim with the bank. Resolution of the claim can take time because the ATM must be serviced, the financial instruments retrieved and recounted, and a corrective transaction posted to the customer's account.

In contrast, example of the present disclosure include improved systems and methods for processing financial instruments in ATMs or other financial instrument processing devices. A user can deposit financial instruments, such as cash or a check, into the ATM, where the financial instruments are processed to determine the monetary value of the financial instruments. Once counted and valued, the financial instruments can be dropped into an escrow chamber. The escrow chamber can have a door or gate to provide the user access to the financial instruments in the escrow chamber during some, or all, of the transaction. In some examples, the escrow chamber can include a window, perforation, grating, or similar in the door such that the financial instruments are visible to the user during the transaction.

The user can be provided the monetary value of their financial instruments, as determined by the ATM, along with an option to continue or to cancel the transaction. If the user selects to continue the transaction, the financial instruments can be moved to a storage unit and the user's account can be credited the monetary value. If the user selects to cancel the transaction, the escrow chamber can open to allow the financial instruments to be retrieved, similar to a transaction with an in-person bank teller deposit. Such a system enables a user to make an automated deposit, pay bills, and perform other transaction at an ATM, with a higher level of convenience and confidence, an added layer of confirmation to ensure accuracy, and an opportunity to retrieve the financial instruments when discrepancies arise.

For ease of explanation, the systems and methods described herein are described with respect to an ATM. One of skill in the art will recognize, however, that the disclosure is not so limited and that the systems and methods could also be used on other applications. Instead of ATM, the system could be used in conjunction with, for example, self-checkout at grocery, and other, stores, vending machines of all sorts, currency exchange, ticket sales, etc. These, and other applications, are contemplated herein.

In addition, although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Embodiments of the present disclosure can include a financial instrument processing device. The device can include a receiving slot configured to receive one or more financial instruments and a financial instrument processing unit in communication with the receiving slot configured to produce a value for the one or more financial instruments. The device can also include an escrow chamber, with a secure state and an open state, in communication with the financial instrument processing unit. The escrow chamber can also be in communication with a financial instrument storage unit.

During a transaction, the one or more financial instruments can be stored in the escrow chamber pending receipt of a confirmation from the customer (i.e., an affirmative indication accepting the transaction or a negative indication canceling the transaction). If the affirmative indication is received, the one or more financial instruments can be transferred from the escrow chamber to the financial instrument storage unit; thus, completing the transaction (e.g., a deposit or a bill payment). If the negative indication is received, on the other hand, the escrow chamber can move from the secure state to the open state to enable the customer to retrieve the one or more financial instruments. Also disclosed herein are methods of making and using the same.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1B:
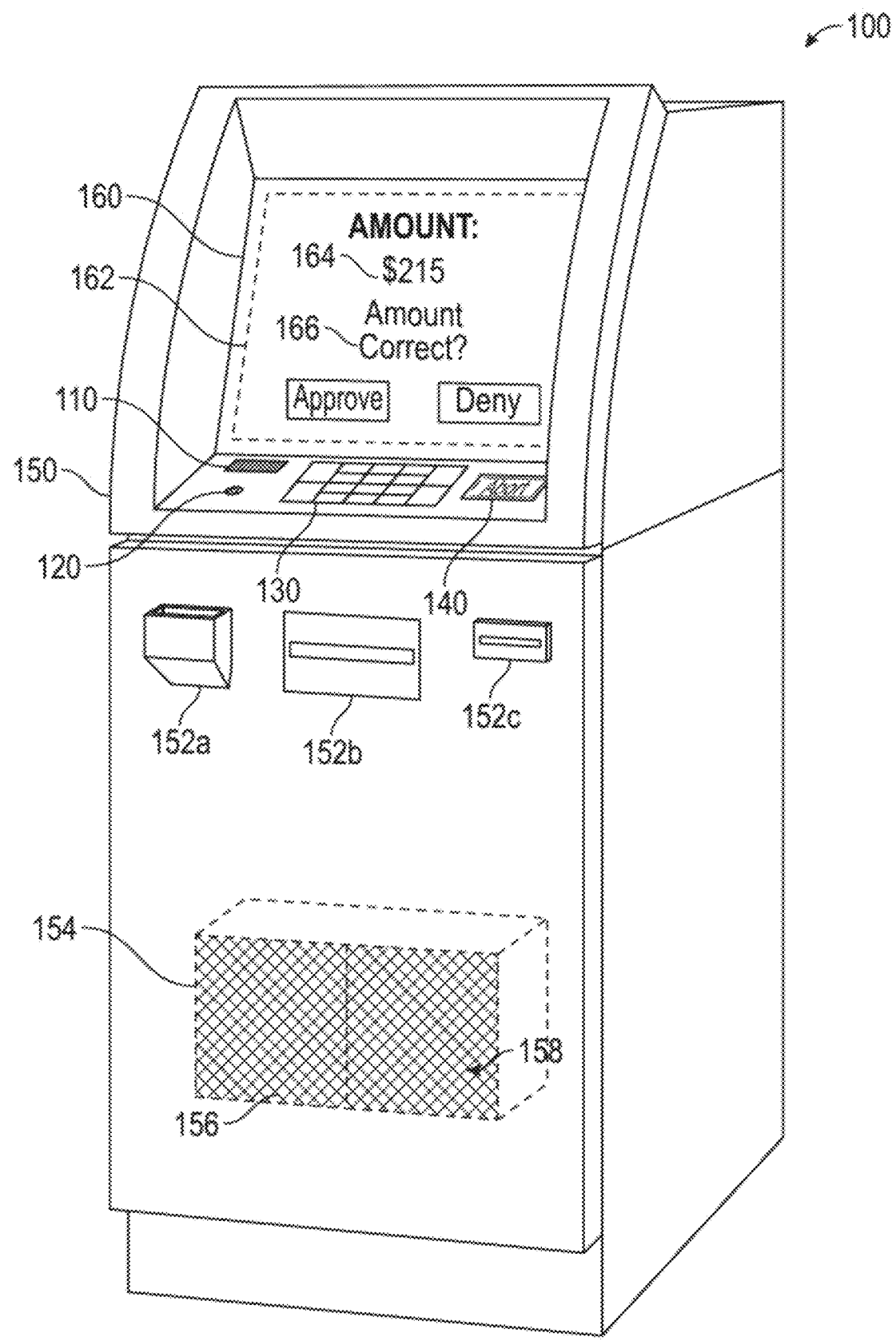
FIG. 1B is a perspective view of another financial instrument processing device according to some embodiments of the present disclosure.

As shown in FIG. 1A and FIG. 1B, a financial instrument processing device 100 can comprise an outer case, or housing 150. Included on the front of the housing 150 can be a receiving slot 152, an escrow chamber 154, and a display 160. In some embodiments, the escrow chamber 154 can define an interior chamber 158, within the housing 150. The interior chamber 158 can be contained within the housing 150 or may be partially exposed on an exterior surface of the housing 150, such as the front of the housing 150. Locating the interior chamber 158 within the housing 150, for example, may add an extra level of security for the interior chamber, for example, while locating the interior chamber 158 on an exterior surface of the housing 150 may improve access and/or reduce complexity. For additional security, the escrow chamber 154 can have a secure (i.e. closed) state and an open state in which access is provided to the interior chamber.

Figure 6A:
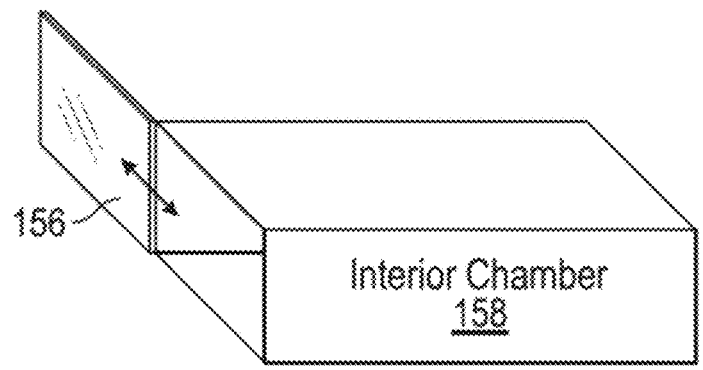
FIGS. 6A-C illustrate examples of doors for an escrow chamber according to some embodiments of the present disclosure.
Figure 6B:
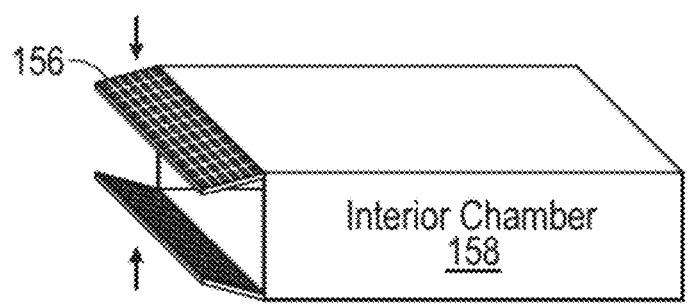
Figure 6C:
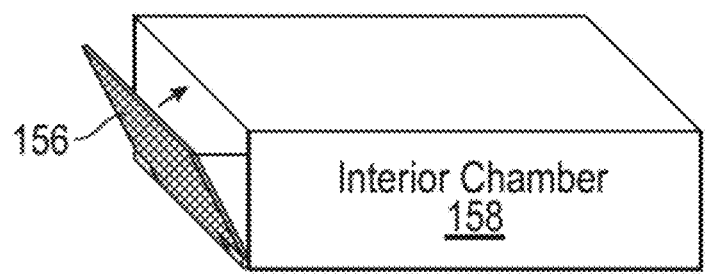

In some embodiments, the escrow chamber 154 can comprise a door 156, which can be configured to transition the escrow chamber 154 between the secure state and the open state. The door 156 may be hingedly coupled to the escrow chamber 154, for example, and configured to swing open in the open state. Alternatively, the door 156 can be disposed on a track, rail, or other sliding device such that the door 156 can slide from the secure state to the open state. Several non-limiting examples of the escrow chamber 154 and associated the door 156 and interior chamber 158 can be found in FIGS. 6A, 6B, and 6C. To secure the door 156 in the secure (or locked) state, the door 156 can comprise latches, pins, locks, or other suitable devices.

The escrow chamber 154 can further comprise a window 159 (shown), mesh, grating, holes, or other suitable design such that the interior chamber 158 is visible, but not accessible in the secure state. Though shown as a window 159 on the door 156 in FIG. 1A, the exterior surface of the housing 150 could also include a window, grate, or the like, such that the interior chamber is visible (e.g., a window disposed in the housing 150 above the escrow chamber). The visual designs can be sufficiently small in size such that a person is prevented from accessing the interior chamber in the secure state while still being able to see into the interior chamber. For instance, if a metal grating is used as the door 156, the spaces between the grating can be small enough to prevent human fingers or other tools from entering the interior chamber while still remaining large enough to ensure the interior chamber is visible from the outside. Alternatively, the visual designs can comprise a transparent material, rather than holes or other openings in the escrow chamber 154. For example, the escrow chamber 154 can comprise a transparent window made from an acrylic or another transparent plastic material.

In some embodiments, the escrow chamber 154 and the door 156 can be made from the same material (e.g., a metal door with a punched grate) and may also be integral (i.e., formed from a single piece of material). A uniform material reduced the number of joints and attachments, thus increasing the overall strength of the escrow chamber 154 and reducing complexity (and thus, labor).

In other embodiments, however, the escrow chamber 154 can be made from multiple materials. For example, as discussed above, the escrow chamber 154 can be made from a solid material, but include a window 159 constructed from a transparent material. In such an embodiment, the door 156, or some portion thereof, can be made from a different material than the window 159 and/or the rest of the escrow chamber 154. The escrow chamber 154 can be made out of carbon steel, for instance, while the door 156 can be made from polymethyl methacrylate to ensure the interior chamber 158 (and the financial instruments) is visible in the secure state. The door 156 may additionally have sufficient strength such that the door 156 is able to withstand forces induced from striking (i.e., with a baseball bat or crowbar), prying, tearing, cutting (i.e., with a saw), wearing (i.e., with a Dremel or sander), explosives, or gunfire while in the secure state. In some examples, some, or all, of the door 156 can be made from Kevlar®, or other suitable composite material.

The escrow chamber 154 can further comprise various connections to other components of financial instrument processing device 100. The escrow chamber 154 can be in electrical communication with a manual override 140, the display 160, and a memory (not shown), among other things. The electrical communication can provide the transfer of power, signals, information, or other similar communications between components. The escrow chamber 154 can receive inputs from, for example, the manual override 140, a touch screen 162 on the display 160, a keypad 130, or a microphone 120, among other things. A customer initiating the manual override 140 to cancel a transaction, for example, can cause the manual override 140 to send a signal to the escrow chamber 154 to transition from the secure state to the open state. In other embodiments, a customer canceling a transaction on the touch screen 162 can cause the touch screen 162 to send a signal to the escrow chamber 154 to transition from the secure state to the open state. In some embodiments, the memory (not shown) can also be in electrical communication with the escrow chamber 154 and configured to send instructions to the escrow chamber 154.

The escrow chamber 154 can also include various inlets and outlets to provide mechanical communication with other components of financial instrument processing device 100. During a transaction, for instance, the financial instrument processing device 100 can transfer one or more financial instruments from the receiving slot 152 (where the one or more financial instruments are received from the customer) to the escrow chamber 154. As shown in FIG. 1B, the receiving slot 152 can also be configured to receive one or more financial instruments in the form of coins (i.e., with a coin hopper 152a), checks (i.e., with a check receiver 152b), or paper bills (i.e., with a bill throat 152c). In some embodiments, the escrow chamber 154 can receive one or more financial instruments from other components of the financial instrument processing device 100, such as a financial instrument processing unit (not shown). Additionally, the escrow chamber 154 can have the ability to transfer one or more financial instruments out of the escrow chamber 154 to other components of financial instrument processing device 100.

Figure 2:
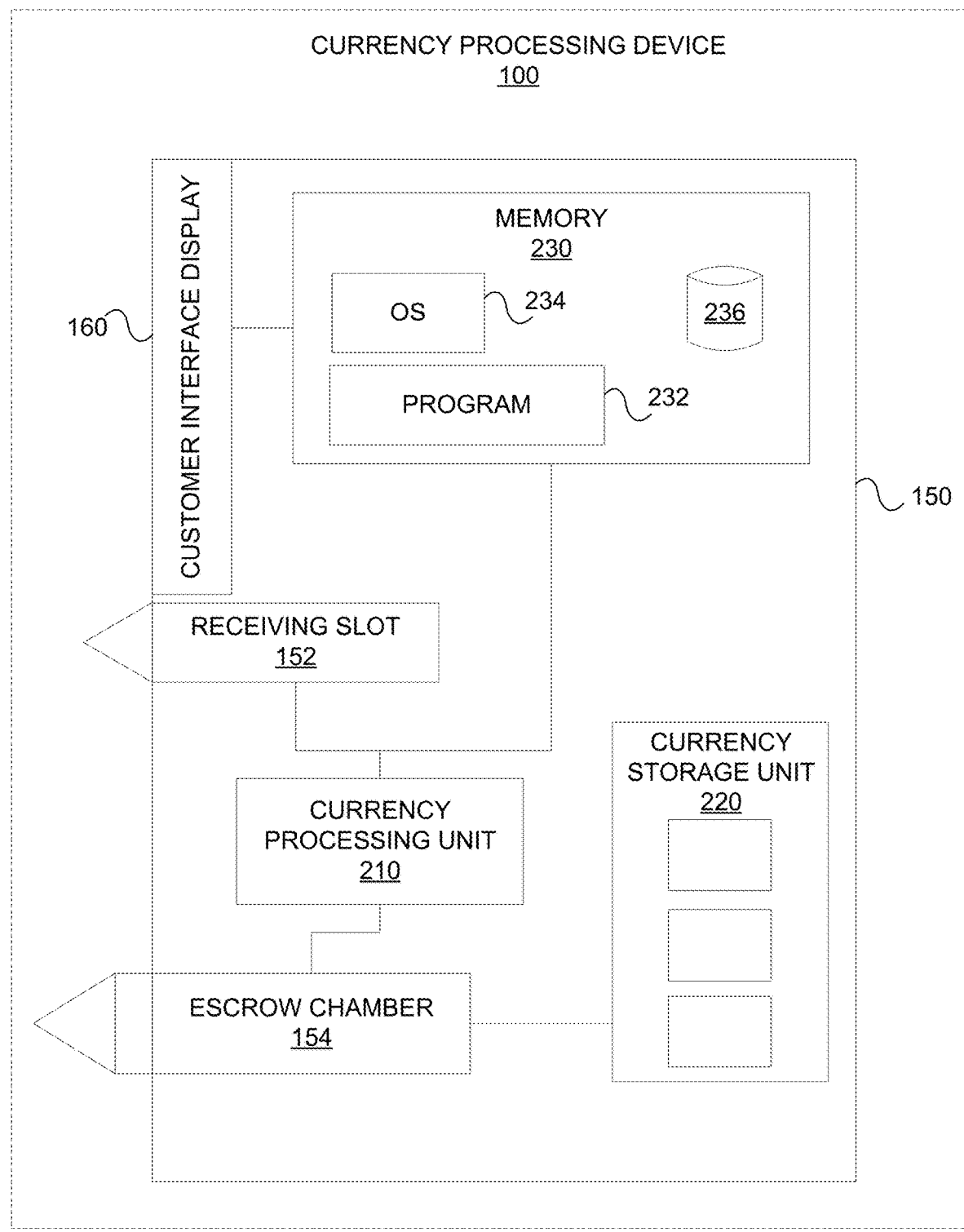
FIG. 2 illustrates a system diagram of a financial instrument processing device according to some embodiments of the present disclosure.

FIG. 2 is a cross-sectional view of a financial instrument processing device 100 illustrating the various components of the financial instrument processing device 100. As shown, receiving slot 152 can be at least partially contained on a front area of the housing 150 and at least partially contained within the housing 150. Receiving slot 152 can receive one or more financial instruments (i.e., from a customer) and pull the one or more financial instruments into the interior of the housing 150 and the financial instrument processing device 100. Receiving slot 152 can be in mechanical communication with a financial instrument processing unit 210 and can transfer the one or more financial instruments to the financial instrument processing unit 210 to be processed. The financial instrument processing unit 210 can process the one or more financial instruments and be in mechanical communication with the escrow chamber 154. The escrow chamber 154 can receive the one or more financial instruments after they have been processed by the financial instrument processing unit 210. As discussed above, the escrow chamber 154 can have various inlets and outlets placing it in mechanical communication with other components, such as a financial instrument storage unit 220. The escrow chamber 154 can transfer the one or more financial instruments to the financial instrument storage unit 220 for safe and secure storage.

The components described herein can further be in electrical communication with each other, as well as with other components of the financial instrument processing device 100. The financial instrument processing device 100 can comprise a memory 230 storing various instructions, programs, databases, and the like, such as an operating system (OS) 234, a program 232, and a storage device 236. In some embodiments, the memory 230 can further comprise one or more processors to execute programs, store data, communicate with other components, and the like. The memory 230 can also provide external communication. For example, the memory 230 can communicate over a network with various systems, such as a security system or an account provider system.

In some embodiments, the memory 230 can communicate within the financial instrument processing device 100. The memory 230 can communicate with the display 160, for instance, to provide a user interface (UI) or other graphics to a customer. The memory 230 can further allow or facilitate communicate of the other components of the financial instrument processing device 100. For example, the memory 230 can receive a value 164 of one or more financial instruments processed by the financial instrument processing unit 210. The memory 230 can then cause the display 160 to display the value 164 to the customer, as shown in FIGS. 1A and 1B. The memory 230 can cause the display 160 to provide a message 166 of a transaction initiated by a customer. If a customer elects to cancel the transaction at the touch screen 162, for example, the memory 230 can send a signal to the escrow chamber 154 to transition to the open state. If a customer elects to continue the transaction at the touch screen 162, the memory 230 can send a signal to the escrow chamber 154 to transfer one or more financial instruments to the financial instrument storage unit 220.

In some embodiments, the connection between the memory 230 and an account provider system over a network can complete a transaction. For example, after one or more financial instruments have been processed to obtain a value 164, and the value 164 has been confirmed on the display 160 by a customer, the memory 230 can provide the value 164 to the account provider system to credit the value 164 to the account associated with the customer. In some embodiments, the account provider system can provide information to the financial instrument processing device 100, such as an account balance for the customer, a credit receipt, and the like.

Such an embodiment allows for efficient electrical and mechanical communication of all components in the financial instrument processing device 100. It is understood that the aforementioned examples are meant to be illustrative, and one of ordinary skill in the art would appreciate that several configurations and connections of the various components are possible and contemplated within the scope of this disclosure. Such embodiments as described above allow for efficient and improved processing of transaction and allow for financial instruments to be processed with a greater level of trust to the customer.

Figure 3:
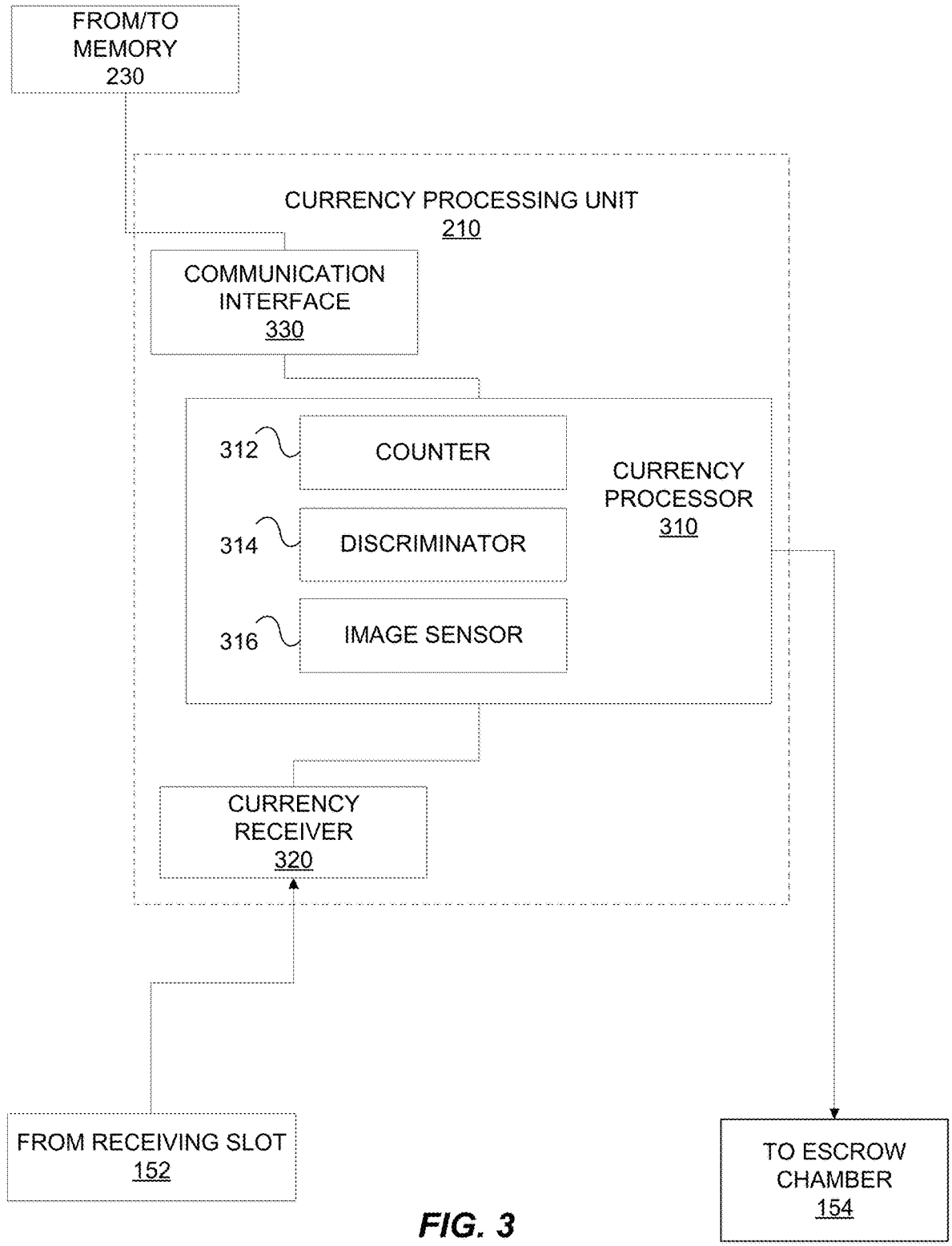
FIG. 3 illustrates a system diagram of a financial instrument processing unit in a financial instrument processing device according to some embodiments of the present disclosure.

FIG. 3 illustrates an exemplary embodiment of a financial instrument processing unit 210 for processing one or more financial instruments during a transaction initiated by a customer of a financial instrument processing device 100. The financial instrument processing unit 210 can comprise a financial instrument receiver 320, a financial instrument processor 310, and a communication interface 330. The financial instrument receiver 320 can be in communication with a receiving slot 152 and can receive one or more financial instruments from the receiving slot 152. The financial instrument receiver 320 can then transfer the one or more financial instruments to the financial instrument processor 310. The financial instrument processor 310 can be in mechanical communication with the escrow chamber 154 and can transfer one or more financial instruments out of the financial instrument processing unit 210 and into the escrow chamber 154. The financial instrument processor 310 can further be in electrical communication with a communication interface 330, providing a connection with the other components of the financial instrument processing device 100 and allowing the financial instrument processing unit 210 to have electrical communication with the memory 230.

The financial instrument processor 310 can comprise several components for processing one or more financial instruments as provided during a transaction. The financial instrument processor 310 can comprise, for instance, a financial instrument counter 312, a discriminator 314, an image sensor 316, and other similar processing components, such as coin sorters, check scanners, size sorters, color sensors, and the like. Other processing components can be present to effectively process one or more financial instruments. Once the processing is complete, the financial instrument processor 310 can provide information to the communication interface 330 to send the information elsewhere in the financial instrument processing device 100. For example, the financial instrument processor 310 can obtain a value 164 of the one or more financial instruments and provide the value 164 to a communication interface 330. The communication interface 330 can then send the value 164 to the memory 230 or directly to the display 160 to display the value 164 to the customer. Additionally, the communication interface 330 can receive instructions or information from elsewhere in the financial instrument processing device 100. For instance, if a customer activates a manual override 140 while the financial instrument processor 310 is processing one or more financial instruments, the communication interface 330 can receive instructions to terminate the processing and send the one or more financial instruments to the escrow chamber 154. The mechanical communication can then transfer the one or more financial instruments out of the financial instrument processing unit 210 and into the escrow chamber 154.

Figure 4:
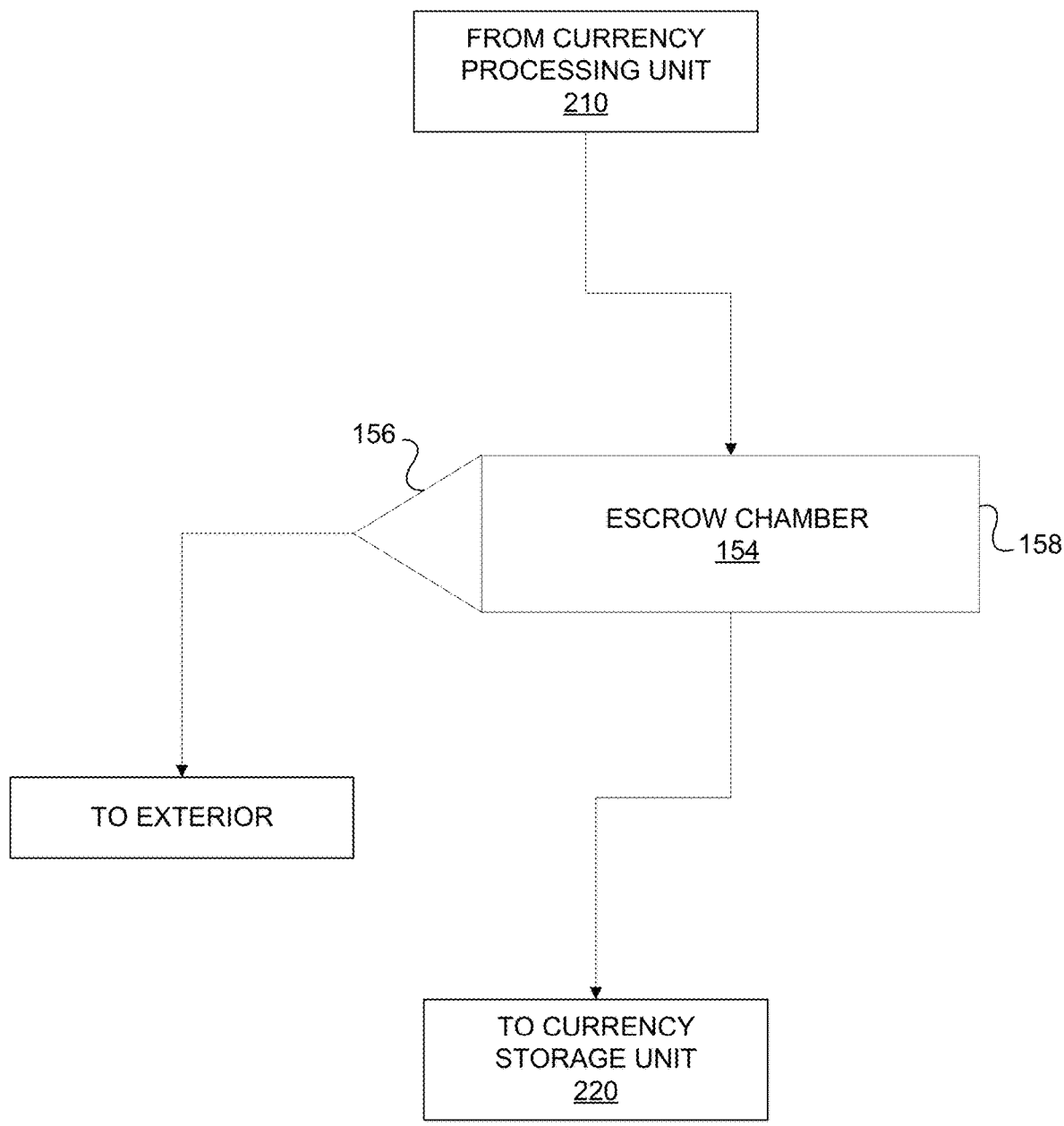
FIG. 4 illustrates a system diagram of an escrow chamber in a financial instrument processing device according to some embodiments of the present disclosure.

FIG. 4 illustrates an exemplary embodiment of the escrow chamber 154 for holding one or more financial instruments during a transaction initiated by a customer of a financial instrument processing device 100. As shown, the escrow chamber 154 can comprise an interior chamber 158 and the door 156. As discussed above, the escrow chamber 154 can be in mechanical communication with other components of the financial instrument processing device 100. For example, the escrow chamber 154 can be in mechanical communication with a financial instrument processing unit 210 to receive one or more financial instruments after processing. The escrow chamber 154 can also be in mechanical communication with a financial instrument storage unit 220 to store one or more financial instruments securely after a transaction has been completed. The escrow chamber 154 can further have additional electrical communication with a memory 230 or other components of the financial instrument processing device 100. If a customer elects to cancel the transaction at a touch screen 162, for example, the memory 230 can send a signal to the escrow chamber 154 to transition to the open state. If a customer elects to continue the transaction at the touch screen 162, the memory 230 can send a signal to the escrow chamber 154 to transfer one or more financial instruments to the financial instrument storage unit 220.

The transition of the escrow chamber 154 from secure state to open state can be accomplished by moving the door 156. The door 156 can be accessible from the exterior of the housing 150 and can provide access to interior chamber 158. The door 156 may be hingedly coupled to the escrow chamber 154 and configured to swing open in the open state.

Alternatively, the door 156 can be disposed on a track, rail, or other sliding device such that the door 156 can slidably open in the open state. Several non-limiting examples of the escrow chamber 154 and associated the door 156 and interior chamber 158 can be found in FIGS. 6A, 6B, and 6C. In order to secure the door 156 in the secure state, the door 156 can comprise latches, pins, locks, and other similar fasteners to securely attach the door 156 to the escrow chamber 154 in the secure state.

Figure 5:
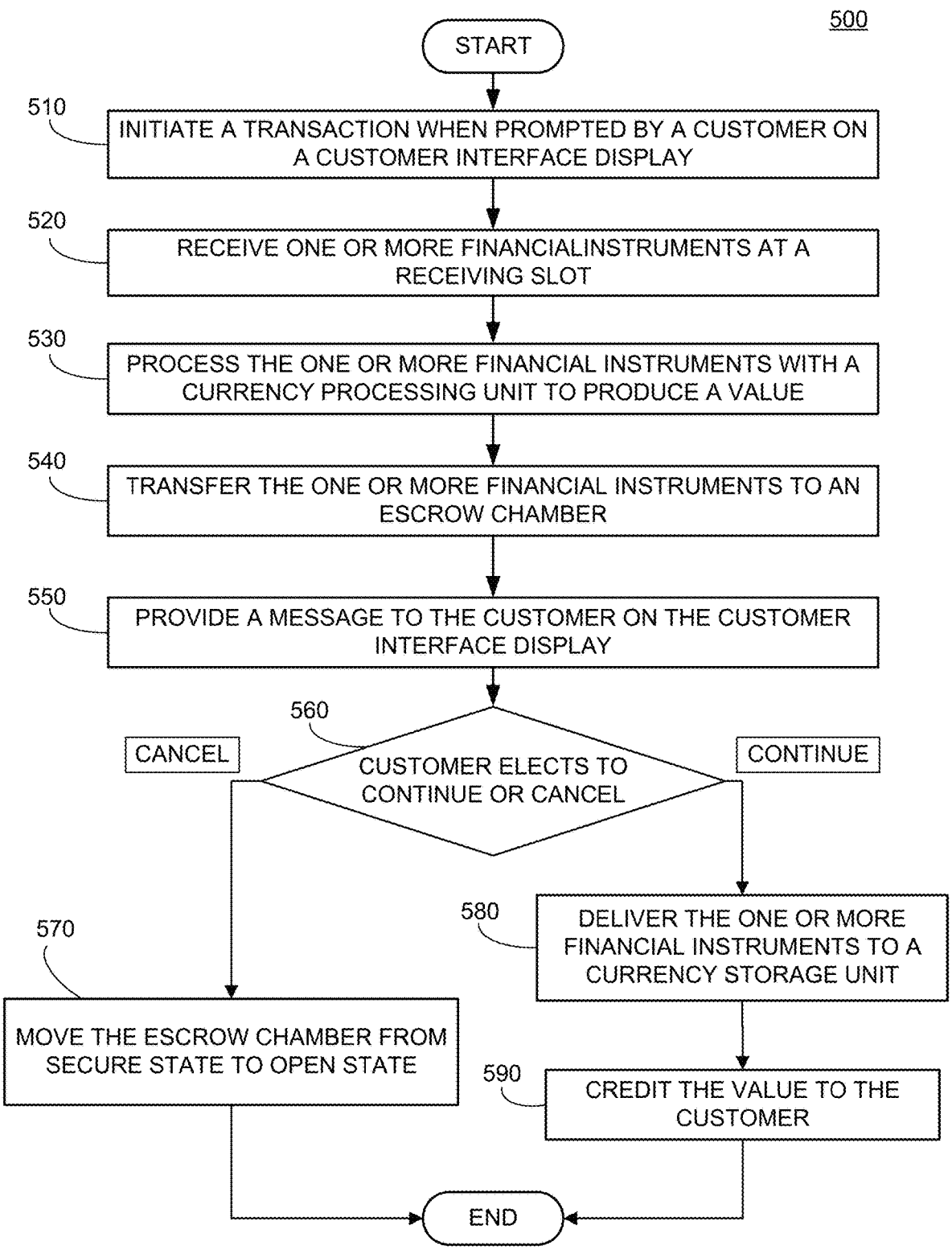
FIG. 5 illustrates a flowchart of a method of using a financial instrument processing device according to some embodiments of the present disclosure.

FIG. 5 illustrates a flowchart of an exemplary method of conducting a transaction using a financial instrument processing device 100. As shown in block 510, a transaction can be initiated on the financial instrument processing device 100 by a customer initiating the transaction at a display 160 (i.e., on a touch screen 162, a keypad 130, or a microphone 120). The transaction, for instance, can be a withdrawal, a deposit, an account balance check, and the like. Messages can be delivered to the customer via the display 160 or a speaker 110 to aid in progressing the transaction. Messages can be created by a memory 230 or stored in the memory 230 (i.e., a program 232). In some embodiments, the memory 230 can communicate with an account provider system to obtain information of the customer or to verify information input by the customer. For example, the financial instrument processing device 100 can ask the customer for other information, such as an account number, a personal identification number (PIN), a password, a transaction type, and the like. In such an embodiment, the memory 230 can allow for a communication link between the financial instrument processing device 100 and an account provider system via a network. In some embodiments, the method then may proceed to block 520.

In block 520, financial instrument processing device can receive one or more financial instruments from the customer. For example, the customer can insert one or more paper bills (i.e., into a bill throat 152*c*) and one or more coins (i.e., into a coin hopper 152*a*) into the financial instrument processing device 100 after indicating the desired transaction is a cash deposit. Other financial instruments may be received by the financial instrument processing device 100 depending on the transaction initiated by the customer. In some embodiments, the receiving slot 152 can comprise additional receivers for multiple types of financial instruments not shown, such as bank card slots, credit card slots, card chips, cashier's checks, money orders, treasury notes, bonds, and the like. In some embodiments, the method then may proceed to block 530.

In block 530, the one or more financial instruments can be transferred to a financial instrument processing unit 210 to be processed. As discussed above, the financial instrument processing unit 210 can, for example, count, sort, stack, image, analyze, or process using other like methods the one or more financial instruments. The financial instrument processing unit 210 can then obtain a value for the one or more financial instruments. The value can be provided to the memory 230 where it can be, for example, stored (i.e., in a storage device 236), sent to the account provider system, or displayed to the customer (i.e., on the display 160 or the speaker 110). In some embodiments, the method then may proceed to block 540.

In block 540, the one or more financial instruments can be transferred from the financial instrument processing unit 210 to the escrow chamber 154. The escrow chamber 154 can contain the one or more financial instruments in an interior chamber 158 while remaining in the secure state. It is understood that the one or more financial instruments can pass through additional components before reaching the escrow chamber 154. In the escrow chamber 154, the one or more financial instruments can remain clearly visible to the customer, such as through a steel mesh, metal grating, transparent window, and the like. Thus, the one or more financial instruments can be visible to the customer while remaining securely contained in the escrow chamber 154 and the interior chamber 158. In some embodiments, the method then may proceed to block 550.

In block 550, a message can be displayed to the customer on the display 160. For example, the value obtained by the financial instrument processing unit 210 can be displayed on the display 160 along with a confirmation message asking the customer if the amount is correct. The customer can then determine if they would like to continue or cancel the transaction based on whether or not the value displayed on the display 160 is correct. The message can further comprise an option to continue or cancel the transaction, and the message can await input from the customer to the options (i.e., on the touch screen 162, the keypad 130, or the microphone 120). Other messages can be displayed to the customer, including but not limited to, asking the customer to confirm their account number, a check number obtained from the financial instrument processing unit 210, a check date obtained from the financial instrument processing unit 210, and the like. The messages can be determined based on information from the financial instrument processing unit 210 and provided to the memory 230, or the messages can be predetermined and stored in the memory 230 (i.e., in the program 232, the OS 234, or the storage device 236). In some embodiments, the method then may proceed to block 560.

In block 560, the customer can determine if they would like to continue or cancel the transaction based on whether or not the value displayed on the display 160 is correct. The message can further comprise an option to continue or cancel the transaction, and the customer can select an option and input the selection to the financial instrument processing device 100 (i.e., on the touch screen 162, the keypad 130, or the microphone 120). In other words, the customer can provide an affirmative indication or a negative indication. For example, the negative indication can be an indication not to continue with the transaction, and indication to cancel the transaction, or an indication that the value is not correct. Alternatively, the affirmative indication can be an indication to continue with the transaction, or an indication that the value is correct.

The input by the customer can be received and processed using the memory 230 to determine how to proceed. Once a determination is made, instructions can be prepared and/or sent from the memory 230 to other components of the financial instrument processing device 100. If the customer elects to cancel the transaction, the method then may proceed to block 570. If the customer elects to continue the transaction, the method then may proceed to block 580.

In block 570, instructions can be sent to the escrow chamber 154 to move from the secure state to the open state. For example, the door 156 can slide open to reveal the interior chamber 158 and, therefore, the one or more financial instruments. The instructions can be sent to escrow chamber in the form of a signal from the memory 230, although it is understood that other methods of transitioning the escrow chamber 154 to the open state are contemplated. For example, if the customer depresses a cancel button on the keypad 130, the depressed button may mechanically transition the escrow chamber 154 to the open state using mechanical operations such as pistons, levers, pulleys, and the like. Once the escrow chamber 154 is in the open state, the customer can then retrieve the one or more financial instruments. In some embodiments, the escrow chamber 154 may transition back to the secure state after a predetermined amount of time. Otherwise, the escrow chamber 154 may transition back to the secure state after the customer indicates that they have retrieved the one or more financial instruments. The customer can do this on, for example, the keypad 130, the touch screen 162, or the microphone 120. In some embodiments, the method may terminate and complete after block 570. However, in other embodiments, the method may continue on to other method steps not shown.

In block 580, instructions can be sent to the escrow chamber 154 to transfer the one or more financial instruments to a financial instrument storage unit 220. The instructions can be sent to escrow chamber in the form of a signal from the memory 230, although it is understood that other methods of transitioning the escrow chamber 154 to the open state are contemplated. In some embodiments, the method then may proceed to block 590.

In block 590, the value of the one or more financial instruments obtained from the financial instrument processing unit 210 can be credited to the customer. For example, the value, being stored in the memory 230, can be provided to the account provider system to indicate that the value should be added to the customer's account. The customer's account may have been determined already based on customer inputs, such as inputting an account number, or the customer's account can be determined by prompting the customer for additional information. In this manner, the account provider system can credit the value obtained by the financial instrument processing device 100 to the customer's account. The memory 230 can be in communication with the account provider system over a network, or other such method of connectivity known to those of ordinary skill in the art. The memory 230 can also provide a message to the customer indicating that the value was credited to their account, such as on the display 160. The memory 230 can also print out a receipt or other transaction confirmation. In such an embodiment, the customer can receive a physical confirmation from the financial instrument processing device 100 that the transaction was processed, and the value was credited to their account. In some embodiments, the method may terminate and complete after block 590. However, in other embodiments, the method may continue on to other method steps not shown.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

While the present disclosure has been described in connection with a plurality of exemplary aspects, as illustrated in the various figures and discussed above, it is understood that other similar aspects can be used, or modifications and additions can be made, to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

Exemplary Use Cases

The following exemplary use cases describe examples of a typical user flow pattern. They are intended solely for explanatory purposes and not limitation.

A transaction can be initiated on a financial instrument processing device 100, such as an ATM. The financial instrument processing device 100 can prompt a customer to insert one or more financial instruments into a receiving slot 152. Once one or more financial instruments are inserted into the receiving slot 152, they can be transferred to a financial instrument processing unit 210. The financial instrument processing unit 210 can process the one or more financial instruments, involving such processes as counting, sorting, imaging, and the like. The financial instrument processing unit 210 can then obtain a value of the one or more financial instruments and store the value in a memory 230 and/or provide the value to the customer via a display 160. The memory 230 can then provide a confirmation message to the customer asking them to continue or to cancel the transaction based on whether or not the value is correct. While the value is being provided to the customer, the one or more financial instruments can be transferred to the escrow chamber 154. In the escrow chamber 154, the one or more financial instruments may remain securely contained by the escrow chamber 154 in the secure state, while still visible to the customer. The financial instrument processing device 100 can then receive an input from the customer in response to the confirmation message (e.g., a message 166). The input can be conducted via a touch screen 162, a keypad 130, and/or a microphone 120. If the customer elected to cancel the transaction, the memory 230 can process the customer input and send a signal to the escrow chamber 154 to transition the escrow chamber 154 to the open state. In this manner, the customer is able to retrieve the one or more financial instruments and cancel the transaction. If the customer elected to continue the transaction, the memory 230 can process the customer input and send a signal to the escrow chamber 154 to transfer the one or more financial instruments to a financial instrument storage unit 220. The one or more financial instruments can then be held securely in the financial instrument storage unit 220 until they are retrieved. The memory 230 can then credit the value to the customer's account in an account provider system via a network. Once credited, the transaction can be terminated, and the customer may be provided a transaction receipt or confirmation.

A customer may walk up to an ATM (i.e., a financial instrument processing device 100) to initiate a transaction. The ATM may prompt the customer to insert one or more financial instruments into a receiving slot 152. The customer may wish to deposit a check and then place their check onto a holder (i.e., a check receiver 152b). The holder may retract into the ATM and transfer the check to a financial instrument processing unit 210. The check can then be processed by a check scanner or imager (i.e., an image sensor 316) to determine information from the check, such as check amount, check date, check number, customer signature, account number, and the like. The check can then be moved from financial instrument processing unit to the escrow chamber 154. Once in the escrow chamber 154, the customer may then be able to see their check (i.e., through a transparent window, a grating, or a mesh) without being able to access their check. This also prevents any malevolent thieves or malicious actors from stealing the customer's check during the transaction. A touch screen display of the ATM (i.e., a display 160) can then display the check information gleaned by the financial instrument processing unit 210. The touch screen display can display the check amount, check date, and endorsement signature and ask the customer to confirm that the information is correct and if they want to continue the deposit. If the customer elects to cancel the deposit because the value is incorrect, the customer can select the cancel option on the touch screen display. The escrow chamber 154 will then open and the customer can retrieve their check. If the customer elects to continue the deposit because the information is all correct, the customer can select the continue option on the touch screen display. The escrow chamber 154 will then transfer the check to a financial instrument storage unit 220 and the value of the check will be credited to the customer's account. The customer may then be provided a deposit receipt.

A customer may walk up to an ATM (i.e., financial instrument processing device 100) to initiate a transaction. The ATM may prompt the customer to insert one or more financial instruments into a receiving slot 152. The customer may wish to deposit $215 in cash paper bills and then insert their bills into a throat (i.e., a bill throat 152c). The throat may then pull the bills into the ATM and transfer the bills to a financial instrument processing unit 210. However, during processing, the customer may realize they accidentally deposited an extra 20 bill that they needed for later. The customer can then activate a manual cancellation button (i.e., a manual override 140) by depressing the button. This can input can be received by a memory 230, and the memory 230 can then send signals to the financial instrument processing unit 210 to terminate processing and immediately send the bills to the escrow chamber 154. The memory 230 can additionally send signals to the escrow chamber 154 to transition from the secure state to the open state. Thus, the customer can retrieve their bills and either move to a different location or try to initiate the deposit again with the correct number of bills.

What is claimed is:

1. A financial instrument processing device, comprising:
   a receiving slot configured to receive one or more financial instruments from a customer;
   a financial instrument processing unit in communication with the receiving slot, the financial instrument processing unit configured to produce a value for the one or more financial instruments;
   an escrow chamber in communication with the financial instrument processing unit, the escrow chamber having a secure state and an open state, the escrow chamber comprising a window disposed on a front area of the financial instrument processing device such that the one or more financial instruments are visible, but not accessible, in the secure state; and
   a financial instrument storage unit in communication with the escrow chamber;
   wherein, during at least a portion of a transaction, the one or more financial instruments are stored in the escrow chamber pending receipt of an affirmative or negative indication from the customer; and
   if the affirmative indication is received:
      the one or more financial instruments are transferred from the escrow chamber to the financial instrument storage unit; or
   if the negative indication is received:
      the escrow chamber moves from the secure state to the open state to enable the customer to retrieve the one or more financial instruments.

2. The financial instrument processing device of claim 1, wherein the receiving slot comprises a bill throat for receiving paper financial instruments.

3. The financial instrument processing device of claim 2, wherein the receiving slot further comprises a coin hopper for receiving coins.

4. The financial instrument processing device of claim 1, wherein the escrow chamber defines an interior chamber and comprises a door accessible from a front area of the financial instrument processing device.

5. The financial instrument processing device of claim 4, wherein the door comprises a grate such that the one or more financial instruments are visible in the escrow chamber, but not accessible, when the one or more financial instruments are in the escrow chamber and the escrow chamber is in the secure state.

6. The financial instrument processing device of claim 4, wherein the door enables the one or more financial instruments to be retrieved from the interior chamber in the open state.

7. The financial instrument processing device of claim 1, further comprising:
   a display configured to display the value, and an option to continue or not continue with the transaction; and
   wherein:
      the affirmative indication is received in response to the customer selecting to continue with the transaction; or
      the negative indication is received in response to the customer selecting not to continue with the transaction.

8. The financial instrument processing device of claim 1, further comprising:
   a manual override configured to send a signal to the escrow chamber to transition from the secure state to the open state.

9. The financial instrument processing device of claim 1, wherein the negative indication is an indication that the value is not correct.

10. The financial instrument processing device of claim 1, wherein the negative indication is an indication to cancel the transaction.

11. The financial instrument processing device of claim 1, wherein the negative indication is an indication not to continue with the transaction.

12. The financial instrument processing device of claim 1, wherein the affirmative indication is an indication that the value is correct.

13. The financial instrument processing device of claim 1, wherein the affirmative indication is an indication to continue with the transaction.

14. The financial instrument processing device of claim 1, wherein the affirmative or negative indication is received in response to a display of the financial instrument processing unit displaying the value, and displaying an affirmative option and a negative option for the customer to make a selection between the affirmative option and the negative option.

15. A method of processing financial instruments, comprising:
receiving one or more financial instruments at a receiving slot of a housing, the receiving slot configured to transfer the one or more financial instruments to a financial instrument processing unit;
processing the one or more financial instruments with the financial instrument processing unit to determine a value for the one or more financial instruments;
transferring the one or more financial instruments to an escrow chamber, the escrow chamber having a secure state, an open state, and an interior portion, the interior portion at least partially visible to a customer in the secure state and in the open state;
providing a message to the customer on a display, the message comprising the value and an option to continue or not to continue a transaction; and
if the customer elects not to continue the transaction:
causing the escrow chamber to move from the secure state to the open state to enable the customer to retrieve the one or more financial instruments; or
if the customer elects to continue the transaction:
transferring the one or more financial instruments to a financial instrument storage unit.

16. The method of claim 15, wherein the receiving slot comprises a bill throat for receiving paper financial instruments.

17. The method of claim 16, wherein the receiving slot further comprises a coin hopper for receiving coins.

18. The method of claim 15, wherein the escrow chamber comprises a window disposed on a front area of the housing such that the one or more financial instruments are visible in the escrow chamber, but not accessible, when the one or more financial instruments are in the escrow chamber and the escrow chamber is in the secure state.

19. The method of claim 15, further comprising:
receiving a signal from a manual override; and
causing the escrow chamber to transition from the secure state to the open state in response to receiving the signal.

20. The method of claim 15, wherein the escrow chamber comprises a door accessible from a front area of the housing.

21. The method of claim 20, wherein the door comprises a grate such that the one or more financial instruments are visible in the escrow chamber, but not accessible, when the one or more financial instruments are in the escrow chamber and the escrow chamber is in the secure state.

22. The method of claim 20, wherein the door enables the one or more financial instruments to be retrieved from the interior portion in the open state.

23. An escrow device, comprising:
a housing defining an interior chamber;
a door, disposed on the housing and having an open state and a secure state, the door accessible from an exterior surface of the housing, the door providing access to the interior chamber in the open state, and the interior chamber at least partially visible in the secure state;
the escrow device being configured to:
receive one or more financial instruments from a financial instrument processing unit during a transaction; and
in response to a customer electing to continue or not to continue with the transaction:
move the door from the secure state to the open state to enable the customer to retrieve the one or more financial instruments if the customer elects not to continue with the transaction; or
transfer the one or more financial instruments to a financial instrument storage unit if the customer elects to continue with the transaction.

24. The escrow device of claim 23, wherein the escrow device is further configured to receive a signal from a manual override to transition the door to the open state during the transaction.

25. The escrow device of claim 23, wherein the door comprises a grate such that the one or more financial instruments are visible, but not accessible, when the one or more financial instruments are in the interior chamber and the door is in the secure state.

26. The escrow device of claim 23, wherein the door is transparent such that the one or more financial instruments are visible, but not accessible, when the one or more financial instruments are in the interior chamber and the door is in the secure state.

* * * * *